(12) United States Patent
Yahner et al.

(10) Patent No.: US 9,206,024 B2
(45) Date of Patent: Dec. 8, 2015

(54) SYSTEMS AND METHODS FOR SENSOR CONTROLLED REACH CARRIAGE (71) Applicants: Joseph Thomas Yahner, Chenango Forks, NY (US); Lans Erik Centerwall, Greene, NY (US)

(72) Inventors: Joseph Thomas Yahner, Chenango Forks, NY (US); Lans Erik Centerwall, Greene, NY (US)

(73) Assignee: The Raymond Corporation, Greene, NY (US)

( * ) Notice: Subject to any disclaimer, the term of this patent is extended or adjusted under 35 U.S.C. 154(b) by 141 days.

(21) Appl. No.: 13/841,660

(22) Filed: Mar. 15, 2013

(65) Prior Publication Data

US 2014/0277958 A1 Sep. 18, 2014

(51) Int. Cl.
*B66F 9/12* (2006.01)
*G01B 7/00* (2006.01)
*B66F 9/075* (2006.01)

(52) U.S. Cl.
CPC ............... *B66F 9/122* (2013.01); *B66F 9/0755* (2013.01); *G01B 7/00* (2013.01)

(58) Field of Classification Search
CPC .......... G01B 7/00; B66F 9/122; B66F 9/0755
See application file for complete search history.

(56) References Cited

U.S. PATENT DOCUMENTS

| | | | |
|---|---|---|---|
| 3,885,692 A | | 5/1975 | Anderson, Jr. |
| 4,480,495 A | * | 11/1984 | Obama ...................... 74/490.05 |
| 6,059,514 A | | 5/2000 | Sanchez |
| 7,036,233 B1 | * | 5/2006 | Schindler ...................... 33/1 PT |
| 2010/0068023 A1 | | 3/2010 | Kuck et al. |

OTHER PUBLICATIONS

"Sensor Sense: Measuring rpms." Machine Design Feb. 9, 2006. Web. Accessed Mar. 25, 2015.*

* cited by examiner

*Primary Examiner* — John Q Nguyen
*Assistant Examiner* — Michael Kerrigan
(74) *Attorney, Agent, or Firm* — Quarles & Brady LLP (57) ABSTRACT

Automated systems and methods control the velocity of the extension arm of a reach carriage. In particular, the extension arm is allowed to operate at full velocity when it is not approaching its extension or retraction limits. At the limits, the extension arm is gradually slowed to a stop. A sensing apparatus includes a sensor and a marker that moves with the movement of the extension arm. The marker moves into and out of the sensor's range, causing the sensor to generate a position signal. If the extension arm is nearing its limit, the marker is outside the sensor range. A control unit detects changes in the position signal and slows the extension arm accordingly. The control unit may apply a deceleration profile to cushion the extension arm at its limits.

22 Claims, 12 Drawing Sheets

SYSTEMS AND METHODS FOR SENSOR CONTROLLED REACH CARRIAGE

CROSS-REFERENCE TO RELATED APPLICATIONS

Not applicable.

STATEMENT CONCERNING FEDERALLY SPONSORED RESEARCH OR DEVELOPMENT

Not applicable.

FIELD OF THE INVENTION

The present invention relates to controlling a lift truck reach carriage, and more specifically to using a sensor to control the velocity of a lift truck reach carriage.

BACKGROUND OF THE INVENTION

Lift trucks, also known as forklifts, are commonly used to raise and position heavy loads on elevated surfaces. Some lift trucks include a reach carriage that extends horizontally away from the mast of the lift truck to "reach" a position that is within the reach carriage's limit of extension. Such lift trucks are referred to herein as "reach trucks." Typically, a reach truck's reach carriage includes a pantographic extension arm connected between the mast and the fork assembly. Extension and retraction of the extension arm is conducted using a hydraulic ram cylinder attached between the mast and a pivot point of the extension arm. The extension arm extends as the cylinder fills with fluid, and retracts as the cylinder empties.

Considering that, during operation of the extension arm, the fork assembly may support a load of several tons significantly far off the ground, close control of the extension arm velocity may be needed to avoid abrupt stops at the extension arm's limits. In particular, it would be advantageous to gradually or incrementally slow the extension arm as it approaches its fully extended or fully retracted positions. This may be done manually by the operator if the reach truck has operator controls therefore. However, this method may be imprecise, and the extension arm position could be ignored or miscalculated by the operator.

Previous approaches for controlling the reach carriage velocity include continuous positional feedback encoders and specially-machined hydraulic ram cylinders, both of which have significant drawbacks. Encoders track the position of the extension arm with a continuously-operating servo motor, and provide position data to the reach truck's electrical systems to control flow rate into and out of the cylinder. Encoders add significant manufacturing cost, contributed by both the cost of the encoders themselves and the cost of designing mechanical and electrical operations to include the encoders. Encoders are also subject to wear and damage due to their continuous operation, and add replacement costs. Specially-machined hydraulic ram cylinders endeavor to control the flow rate of fluid into the cylinder with permanent contained structures. These devices also carry a high cost, and further may be significantly more complex than a typical hydraulic ram cylinder. The complexity invites manufacturing defects and inconsistencies, as well as machine surface and linkage failures due to relatively poor tolerance.

It would therefore be desirable to incorporate automated systems and methods to control the velocity of the reach carriage without adding significant cost and complexity to the reach truck.

SUMMARY OF THE INVENTION

The invention overcomes the drawbacks of previous reach carriage control systems by detecting a range of positions of the extension arm and providing responsive hydraulic acceleration or deceleration without additional moving or specially-machined parts.

The invention provides systems and methods of controlling the velocity of the reach carriage using a sensor that senses the proximity to the sensor of a marker, wherein one or both of the sensor and marker move with the movement of the extension arm. The sensor provides a position signal to a control unit, the position signal indicating whether the extension arm is approaching its extension or retraction limit. Based on the position signal, the control unit may apply or release automated control of the reach carriage velocity. The control module may employ an acceleration profile to gradually speed up the extension of the reach carriage and/or a deceleration profile to gradually slow the reach carriage to a stop.

In one embodiment, a velocity control device for a reach carriage having an extension arm comprises: a sensing apparatus configured to detect when the extension arm is approaching at least one of an extension limit and a retraction limit, and to transmit a position signal, the sensing apparatus comprising: a sensor that generates the position signal; and a marker configured to move into and out of a range of the sensor as the extension arm extends and retracts; and a control unit configured to receive the position signal and to slow the extension arm to a stop depending on the position signal.

In another embodiment, in a reach carriage having a carriage frame and a pantographic extension arm attached to the carriage frame and driven by a hydraulic ram cylinder attached to the carriage frame, the extension arm, and a hydraulic pump, a velocity control device for the extension arm, the velocity control device comprises: a sensing apparatus comprising: a sensor attached to a clevis on the carriage frame, the sensor having a range and generating a position signal when the sensor is activated; and a marker that activates the sensor when the marker is in the range of the sensor, the marker being attached to a tang of the hydraulic ram cylinder, the tang cooperating with the clevis, and the marker rotating through an angular range, within which the sensor range is disposed, as the extension arm linearly extends and retracts; and a control unit operatively connected to the sensor and the hydraulic pump and configured to receive the position signal and to instruct the hydraulic pump to reduce or increase a flow rate to the cylinder depending on the position signal.

In yet another embodiment, a method of controlling the velocity of an extension arm in a reach carriage, the method comprises: as the extension arm is being driven by an actuator, receiving a position signal from a sensing apparatus comprising: a sensor that generates the position signal; and a marker configured to move into and out of a range of the sensor as the extension arm extends and retracts; determining from the position signal whether the extension arm is approaching its extension or retraction limit; if the extension arm is approaching its extension or retraction limit, instructing the actuator to gradually reduce an actuation speed; and allowing the extension arm to be driven at full velocity if the extension arm is not approaching its extension or retraction limit.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

The invention will now be described more specifically with reference to the following embodiments. It is to be noted that the following descriptions of preferred embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "connected" and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically. Thus, although schematics shown in the figures depict example arrangements of processing elements, additional intervening elements, devices, features, or components may be present in an actual embodiment.

The various embodiments of the invention will be described in connection with systems and methods for controlling the velocity of a reach carriage having an extension arm that extends and retracts with respect to a mast of a reach truck. That is because the features and advantages of the invention are well suited for this purpose. Still, it should be appreciated that the various aspects of the invention can be applied to other vehicles and in other industries and processes capable of utilizing an extending arm, particularly a pantograph.

Figure 1:
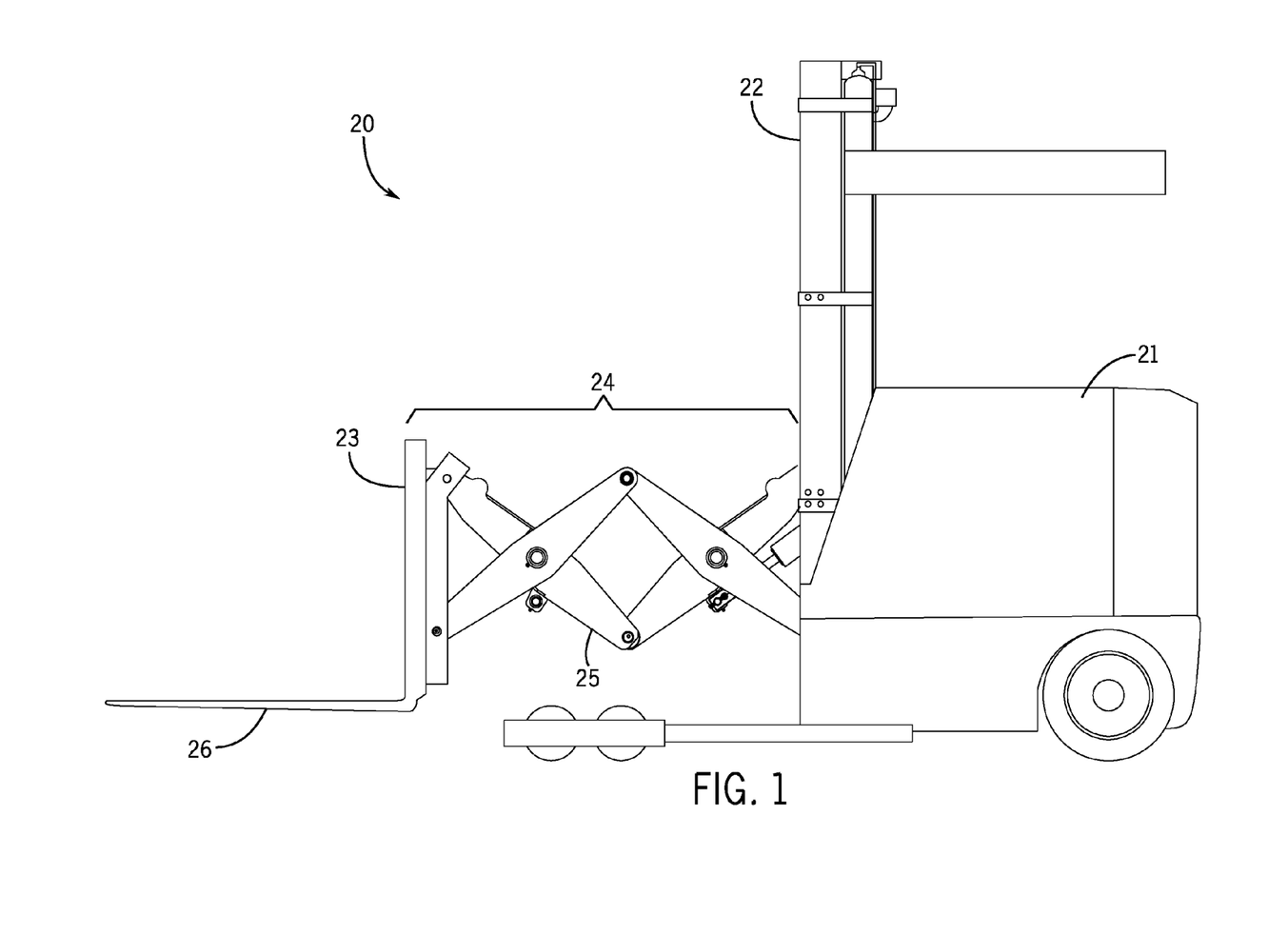
FIG. 1 is a left side view of a reach truck in accordance with this disclosure.

Referring now to the Figures, and more particularly to FIG. 1, the general arrangement of a representative vehicle, such as a reach truck 20, incorporating a reach carriage 24 is shown. For simplicity, the detailed description will describe the embodiments associated with the reach truck 20 incorporating the reach carriage 24. It is to be appreciated that the details of the invention may also be beneficial and adapted for a wide variety of devices and vehicles, including a reach truck where the reach carriage is coupled to a mast 22, and the mast is configured to extend and retract. Although the reach truck 20, by way of example, is shown as a standing configuration lift truck, it will be apparent to those of skill in the art that the features of the invention are not limited to vehicles of this type, and can also be provided in various other types of vehicles, including but not limited to, other material handling and lift vehicle configurations.

As seen, one embodiment of the reach truck 20 includes an operating unit 21 that may serve as a weighted base for the reach truck 20 and also provides controls to an operator for moving reach truck 20 and operating the reach carriage 24. The reach truck 20 includes a vertically oriented mast 22 mounted relative to the operating unit 21. The reach carriage 24 includes an extension arm 25 that connects the mast 22 to a lift assembly 23, which may comprise one or more forks 26. The extension arm 25 is illustrated as a double pantographic arm but may be a single pantographic arm (see FIG. 3), or more than a double pantographic arm. Other known extension mechanisms are contemplated, including drive systems, rails, slides, glides, gears, cables, and the like. The extension arm 25 can extend and retract in other fashions, such as by telescopic operation. Manipulation of the controls by the operator may cause various motors, wheels, cables, pneumatic or hydraulic pistons, and other mechanical components to raise and lower the reach carriage 24 along the mast 22, and to extend and retract the extension arm 25 with respect to the mast 22.

Figure 2:
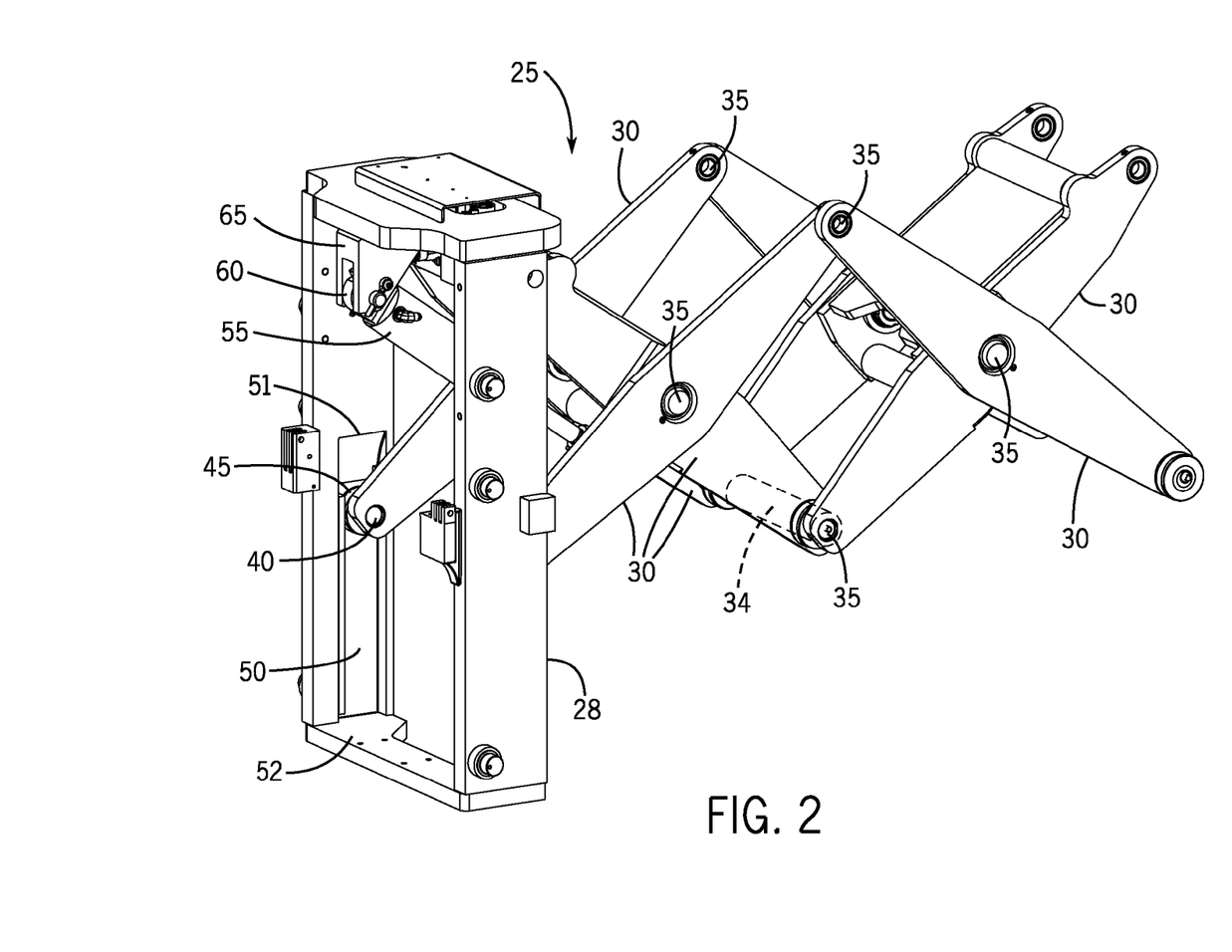
FIG. 2 is a top right rear perspective view of an extension arm connectable to a mast in accordance with this disclosure.
Figure 3:
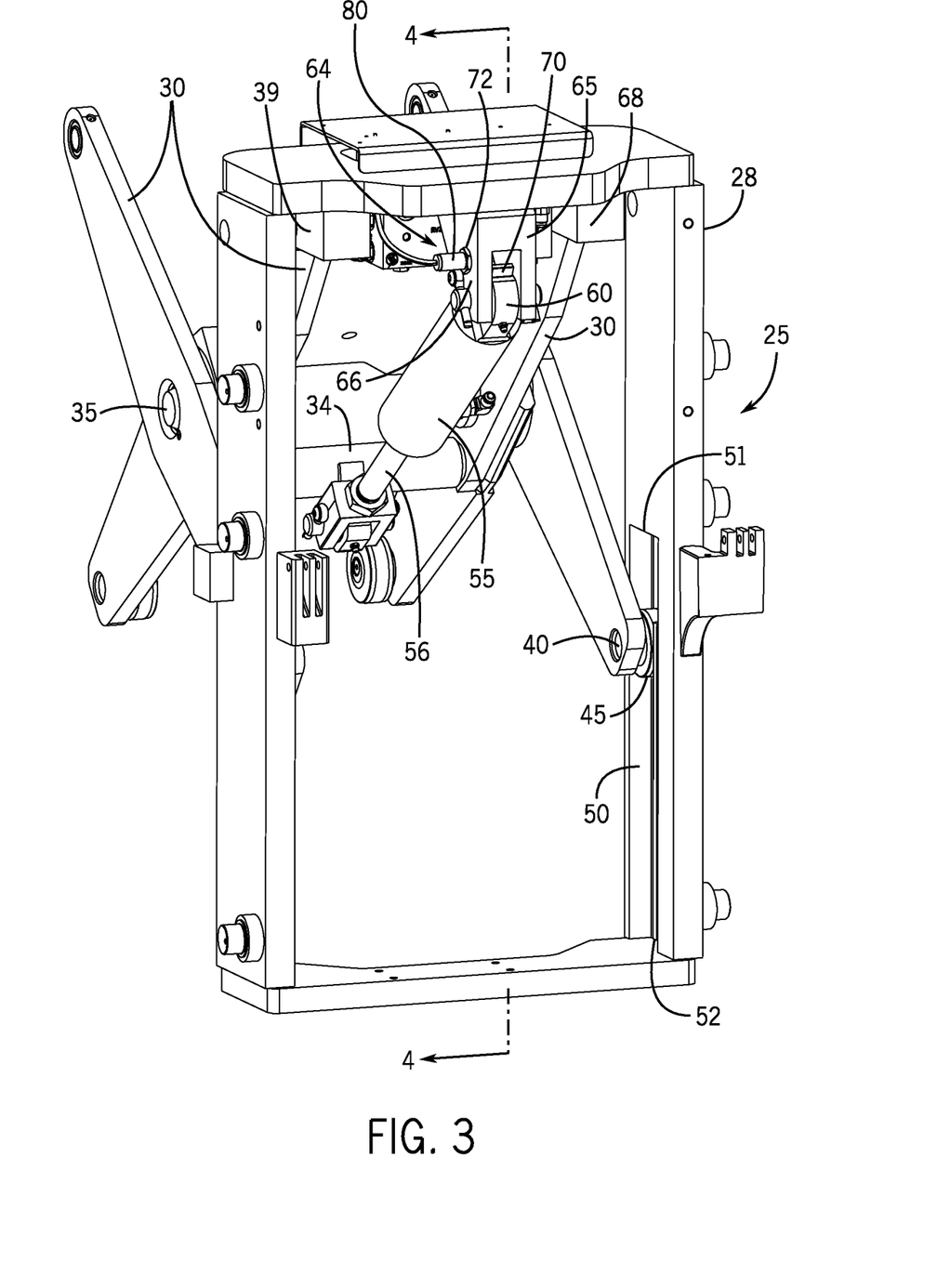
FIG. 3 is a top left rear perspective view of an extension arm showing a first embodiment of a top-mounted sensing apparatus in accordance with this disclosure.

Referring to FIGS. 2 and 3, the extension arm 25 may include a plurality of pivotably interconnected rigid members, referred to herein as studs 30. A stud 30 may connect to one or more adjacent studs 30 at a midpoint or an endpoint of each stud 30, at one or both sides of the extension arm 25, to create a pantograph as is known in the art. A pivot 35 is formed at each attachment point between studs 30. The extension arm 25 pivotally attaches to a carriage frame 28 of the reach assembly 24. In some embodiments, the carriage frame 28 can movably attach to and translate vertically along the mast 22. The extension arm 25 attaches to the carriage frame 28 at a stationary pivot 39 at the top of the extension arm 25 and a translating pivot 40 at the bottom of the extension arm 25. The stud or studs 30 attaching at the translating pivot 40 may be attached to a wheel 45 disposed within a vertical channel 50 on the carriage frame 28. The wheel 45 moves vertically up the channel 50 to extend the extension arm 25 and down the channel 50 to retract the extension arm 25 according to pantographic motion. The top 51 of the channel defines the extension limit of the extension arm 25 and the bottom 52 of the channel defines the retraction limit, provided the reach truck 20 does not include a bumper or another structure for stopping extension and/or retraction.

The motion of the extension arm 25 may be mechanically controlled with at least one hydraulic ram cylinder 55. The cylinder 55 attaches at a proximal end to the carriage frame 28 and at a distal end to an axle 34 attached between the studs 30 that are attached to the carriage frame 28 at the stationary pivot 39. The cylinder 55 may be attached at one or both ends with a clevis fastener. The carriage frame 28 may include an integral clevis 65 that cooperates with a tang 60 on the cylinder 55 to allow rotation of the cylinder 55 around a clevis pin 62 (see FIG. 4). The tang 60 may be bolted, welded, or otherwise attached to the cylinder 55 as is known in the art. The cylinder 55 may be attached to a fluid supply hose (not shown) connected to a hydraulic pump (not shown) that fills and empties the cylinder 55 to create the pressure differentials that operate the ram 56 of the cylinder 55 to extend or retract the extension arm 25, as is known in the art. According to the present disclosure, the cylinder 55 may be any hydraulic or pneumatic cylinder suitable for operating the reach carriage of a reach truck.

Figure 4:
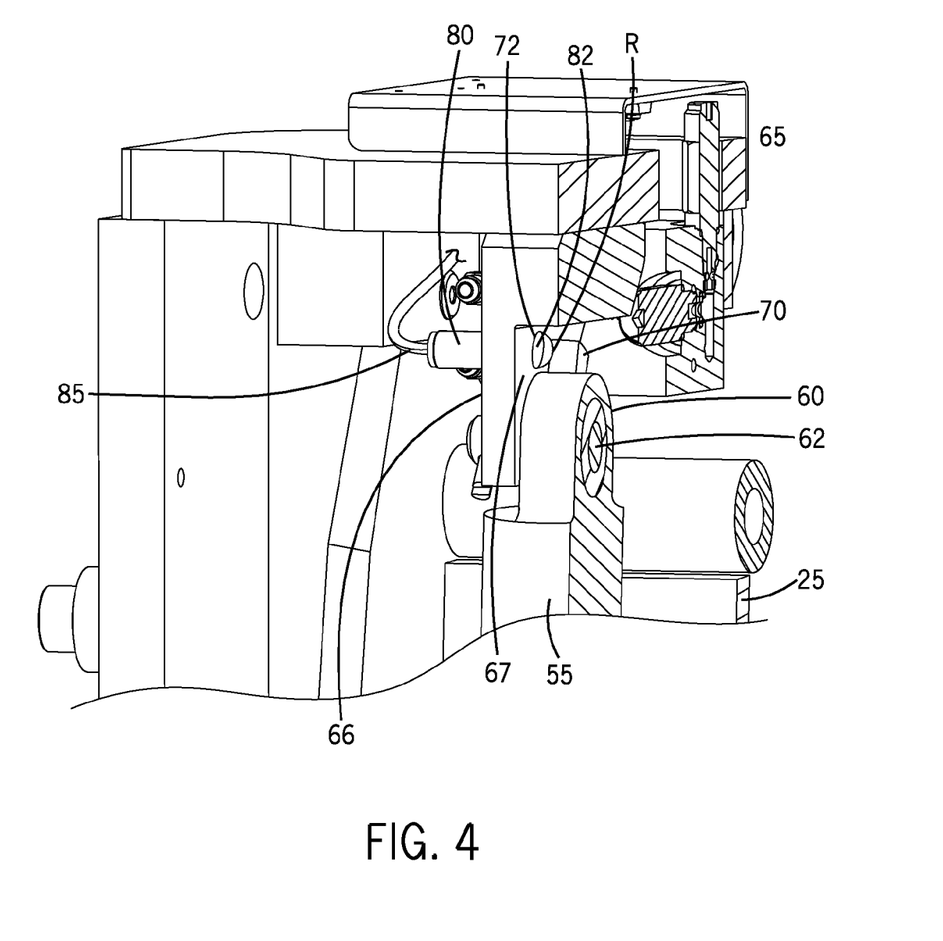
FIG. 4 is a cross-sectional rear perspective view of a portion of the extension arm of FIG. 3, taken along line 4-4 of FIG. 3.

Referring to FIGS. 3 and 4, a first embodiment of a sensor apparatus 64 may include a marker 70 mounted on the tang 60, the marker 70 cooperating with a sensor 80 mounted on the clevis 65. The marker 70 may be a solid structure attached to or integral with the tang 60 and projecting outward from the tang 60 into the space between the prongs 66, 68 of the clevis 65 above the tang 60. The marker 70 may be attached to the tang 60, such as by welding, threaded cooperation, or friction fit, but such non-integral attachments introduce a tolerance risk due to the possibility of the marker 70 becoming loose or misaligned. Preferably, therefore, the marker 70 is integral with the tang 60, such as by machining the tang 60 and marker 70 from a single piece of bar stock, in order to maximize tolerance control.

In one embodiment, as illustrated, a mounting aperture 72 may be provided in a prong 66 of the clevis 65 and the sensor 80 may be mounted therein. The mounting aperture 72 may be positioned so that the sensor 80 cooperates with the marker 70, in that the marker 70 passes through the sensing range R of the sensor face 82. In some embodiments, due to the restrictive tolerances of the machined parts, the sensor face 82 can be substantially planar and can be flush with the inner surface 67 of the prong 66 in which the sensor 80 is mounted. The sensor 80 may be a physical sensor, e.g., a limit switch, or a proximity sensor, such as a magnetic or capacitive sensor that reacts to the presence of ferrous metals within its range R and without contact. The marker 70 may therefore be a ferrous metal or another material to which the sensor 80 reacts. In some embodiments, the marker 70 may be the same material as the cylinder 55, and the range R of the sensor 80 may be sufficiently short so as not to undesirably detect the cylinder 55 instead of the marker 70. The sensor 80 may further include a transmission cable 85 that transmits a signal to a control unit 100 as described below. Alternatively, the sensor 80 may wirelessly transmit a signal to the control unit 100.

In some embodiments, the sensor 80 can be inactive when the marker 70 is not in the sensor's range R, and activates upon sensing that the marker 70 is within the range R. The marker 70 may be positioned on the tang 60 so that the marker 70 is forward of the sensor 80 range R when the extension arm 25 is fully or nearly fully retracted, and the marker 70 is rearward of the sensor 80 range R when the extension arm is fully or nearly fully extended. It will be understood that "nearly" full extension or retraction refers to the position of the reach carriage 24 when the marker 70 moves out of the range R of the sensor 80 in either direction. This position may be configured by the operator using a software configuration tool as described below. A default position may be between about 4 and about 8 inches away from the fully extended or retracted positions, although other positions are contemplated, and can depend on the application and the extension arm 25 configuration. A default position may also depend on the weight of the load and the maximum velocity of the reach carriage 24, for example. As the cylinder 55 pressurizes and extends the extension arm 25, the tang 60 and marker 70 move, e.g., rotate, counter-clockwise around the clevis pin 62. As the cylinder depressurizes and retracts the extension arm 25, the tang 60 and marker 70 rotate clockwise around the clevis pin 62. Thus, in some embodiments, the marker 70 can pass into, through, and completely out of the sensor 80 range R along the full path, referred to as the "stroke," of the extension arm 25. The distance that the extension arm 25 travels when the marker 70 is not within the sensor 80 range R is the cushion distance, as described below.

Figure 5:
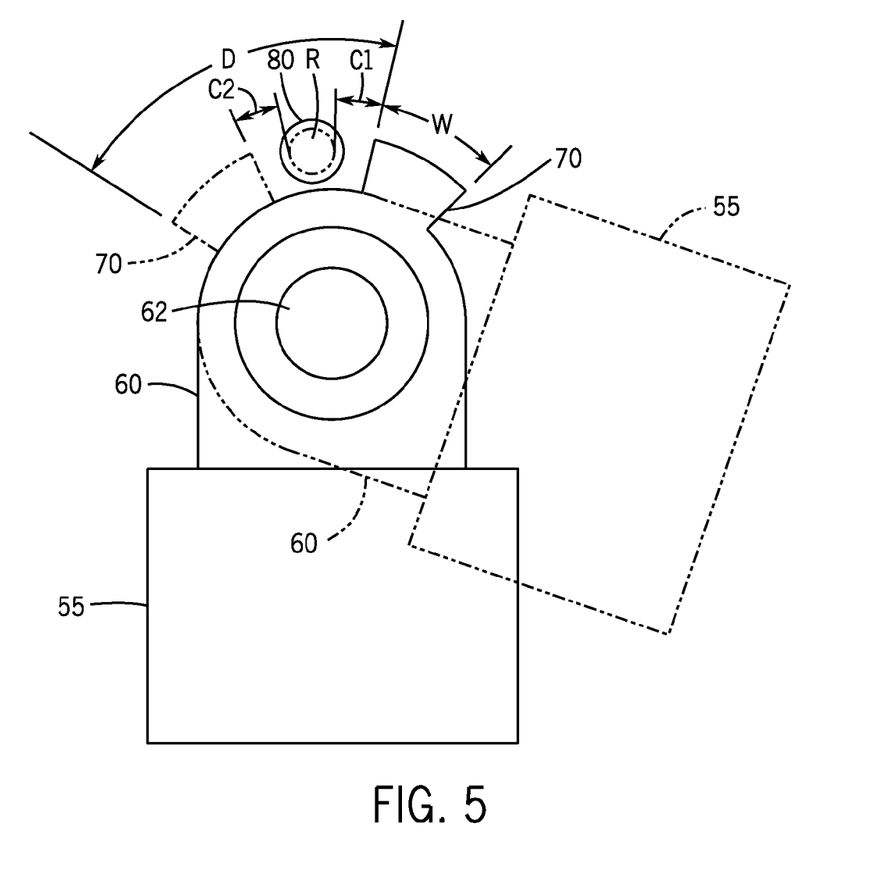
FIG. 5 is a plan view of the sensing apparatus of FIGS. 3 and 4 showing the angular range of a marker.

Referring to FIG. 5, the length of the stroke of the extension arm 25 from a fully retracted position to a fully extended position determines the angular range D through which the marker 70 may travel during all or part of the stroke. In order to provide a cushion of deceleration as the extension arm 25 approaches the fully extended and fully retracted position, the width W of the marker 70 and position of the marker 70 on the tang 60 are configured to leave a first cushion distance C1 between the proximal edge of the marker 70 and the outer limit of the sensor's 80 range R, and a second cushion distance C2 between the distal edge of the marker 70 and the outer limit of the sensor's 80 range R. The first cushion distance C1 is traversed by the proximal edge of the marker 70 as the extension arm 25 is retracted to its fully retracted position, and the second cushion distance C2 is traversed by the distal edge of the marker 70 as the extension arm 25 is extended to its fully extended position. While the marker 70 is traversing the cushion distances C1, C2 as described, the sensor 80 is inactive and the extension arm 25 will undergo a controlled deceleration as described below.

Figure 6:
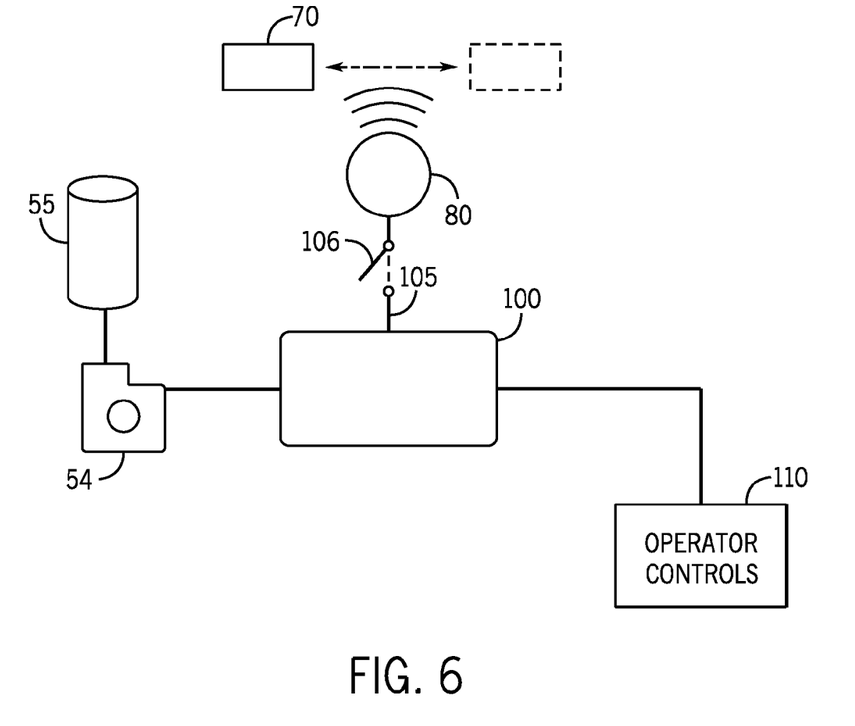
FIG. 6 is a schematic view of a reach carriage velocity control system in accordance with this disclosure.
Figure 7:
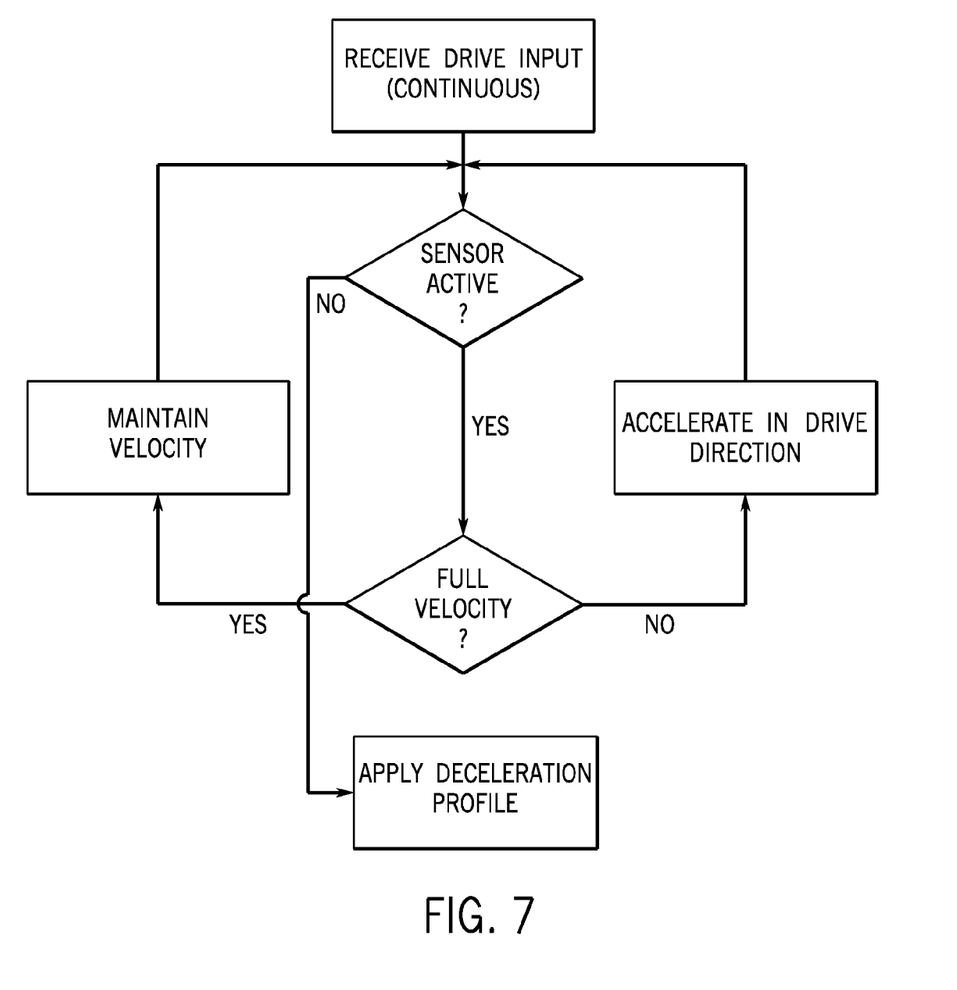
FIG. 7 is a flow chart of a method of controlling the reach carriage velocity in accordance with this disclosure.

Referring to FIGS. 6 and 7, a control unit 100 instructs a hydraulic pump 54 to operate the cylinder 55 according to the position signal received from the sensor 80 and one or more operator controls 110, such as a throttle or stick control. The control unit 100 may be dedicated to control of the cylinder 55, and therefore only extend or retract the extension arm 28, or the control unit 100 may be electrically connected to operate other components of the reach truck 20, such as the carriage frame 28 or the reach truck 20 drive system. The control unit may be a central processing unit or a microprocessor containing software for configuring and operating the reach carriage 24. The control unit 100 may be configured to operate the extension arm 25 according to the present disclosure. In particular, the control unit 100 may communicate with the sensor 80 to determine if the sensor 80 is active or inactive. The control unit 100 may poll the sensor 80 for its status continuously, at predetermined intervals, or only upon receiving a drive input from the operator controls. Alternatively, the control unit 100 may simply check whether an electrical circuit over a sensor line 105 is complete. If it is not complete, this indicates the sensor 80 is inactive. When the sensor 80 senses the marker 70, it closes the gate 106 to complete the circuit. It will be understood that the gate 106 illustrated in FIG. 6 may be outside the sensor 80 or may be part of an integrated circuit within the sensor 80. In another embodiment, the control unit 100 may passively receive a signal from the sensor 80 indicating the sensor 80 status.

While the sensor 80 is active, the control unit 100 may increase the velocity of the extension arm 25 by instructing the hydraulic pump 54 to pressurize or relieve the cylinder 55 at its maximum flow rate. Alternatively, the control unit 100 may apply an acceleration profile to gradually increase the extension arm 25 velocity to full velocity. The acceleration profile may be substantially linear or may have an exponential increase or decay or an s-curve shape, for example. When the sensor 80 deactivates, the control unit 100 may apply a deceleration profile to gradually reduce the flow rate between the hydraulic pump 54 and the cylinder 55. The deceleration profile may be substantially linear or may have an exponential increase or decay or an s-curve shape, for example, that brings the extension arm 25 to rest over a distance, which is typically between about 4 and about 8 inches as described above but may be configured by the operator. The shape of the acceleration profile and the deceleration profile, and the distance over which they can be applied may be the same or different, and may be modified using a software configuration tool.

The control unit 100 may further be configured to store, or retain in memory, the previous operation, particularly "extend" or "retract," input by the operator. If the sensor 80 is inactive when a new operation is input, the control unit 100 may compare the previous operation to the new operation to determine whether to apply an acceleration or deceleration profile to the present operation. For example, if the previous operation was "retract," and the operator stopped the reach carriage 24 when the marker 70 was within the first cushion distance C1, then upon receiving the new operation, the control unit 100 compares the new operation to the previous "retract" operation and: if the new operation is "extend," the control unit 100 applies the normal acceleration profile; and, if the new operation is "retract," the control unit 100 continues to apply the previous deceleration profile to cushion the extension arm 25 along the rest of its retraction path.

Figure 8:
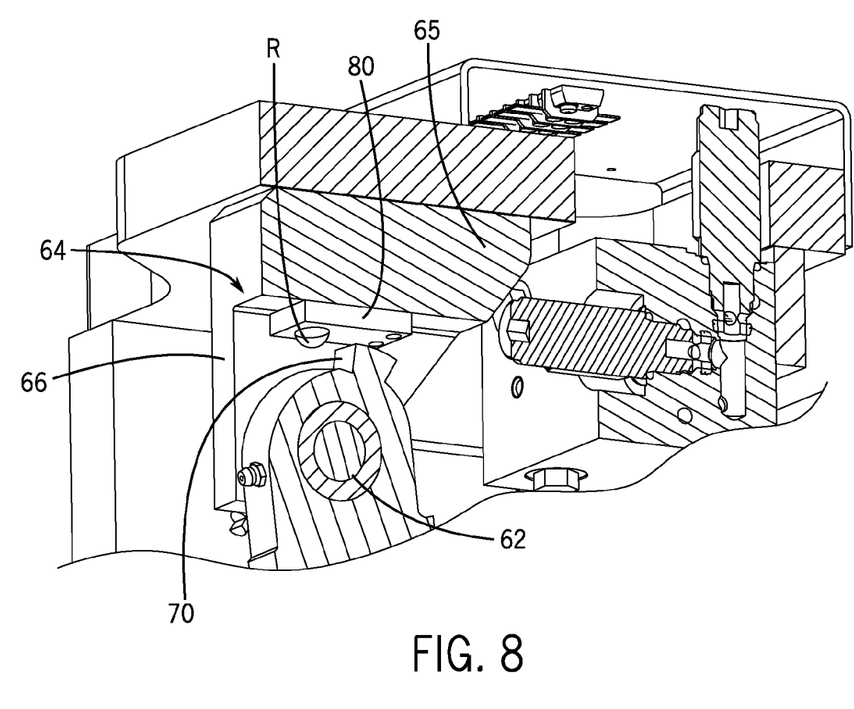
FIG. 8 is a cross-sectional right perspective view of a portion of an extension arm with a second embodiment of a top-mounted sensing apparatus in accordance with this disclosure.
Figure 9:
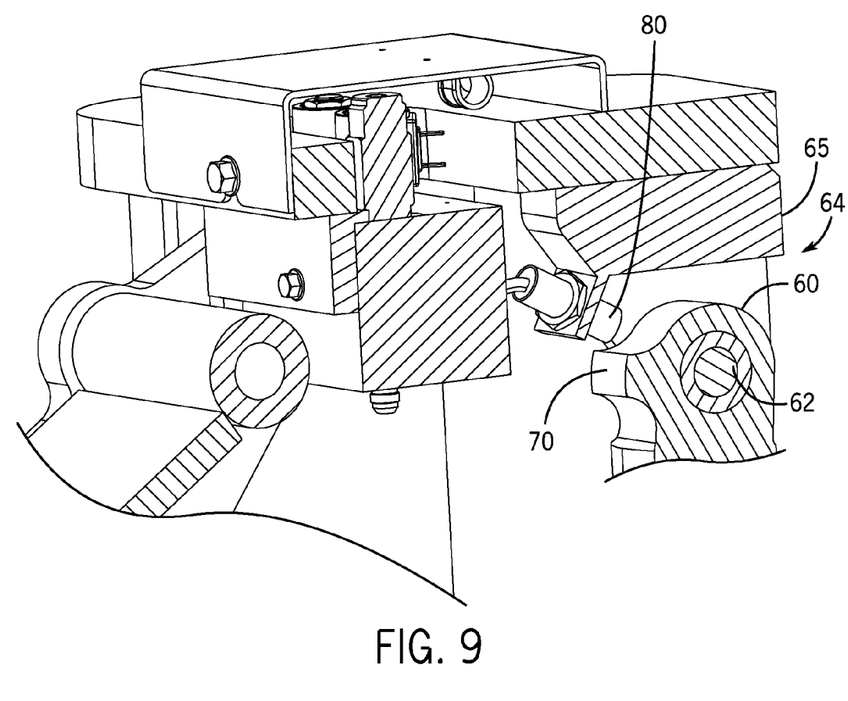
FIG. 9 is a cross-sectional front left perspective view of a portion of an extension arm with an embodiment of a front-mounted sensing apparatus in accordance with this disclosure.

The sensing apparatus of FIGS. 3-5, which comprises the preferred embodiment of the sensing apparatus, may be considered a top-mounted sensing apparatus because the sensor 80 is disposed at or approximate to the top of the tang 60 and sensing is performed as the marker 70 moves over the top of the clevis pin 62. FIG. 8 illustrates a second embodiment of a sensing apparatus. The configuration of the marker 70 may remain as described with reference to FIGS. 4 and 5. The sensor 80 may be disposed at the top of the space between the prongs 66, 68 of the clevis 65. This arrangement allows the sensor 80 to be bolted or otherwise attached to the clevis 65 without need for drilling a mounting hole. Operation of the sensor 80 otherwise proceeds as described with reference to FIGS. 4 and 5. FIG. 9 illustrates another embodiment wherein the sensing apparatus senses the movement of the cylinder 55.

The illustrated embodiment may be considered a front-mounted sensing apparatus, wherein the sensor 80 is mounted to the clevis 65 forward of the tang 60, and the marker 70 is positioned so that it is below the sensor 80 when the extension arm 25 is retracted, and rearward of the sensor 80 when the extension arm 25 is extended. Other orientations of the sensing apparatus' sensor 80 and marker 70 for detecting the movement of the cylinder 55 may be used.

Figure 10:
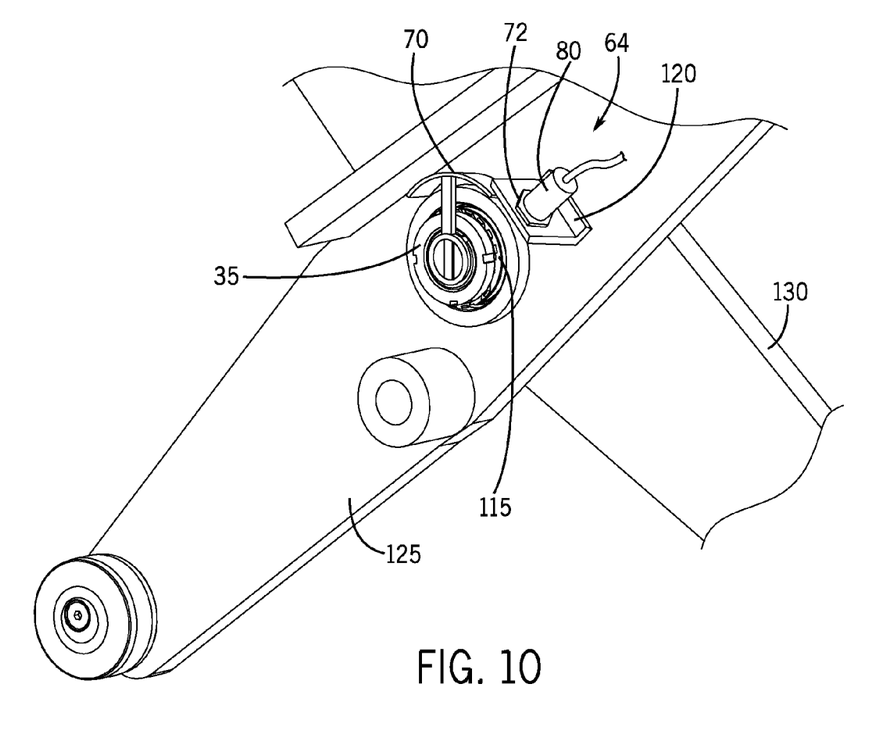
FIG. 10 is a close-up left rear perspective view of a portion of an extension arm with an embodiment of a bearing-and-stud-mounted sensing apparatus in accordance with this disclosure.

The sensing apparatus may further detect the movement of other parts of the extension arm 25 to carry out the velocity control functions described herein. Referring to FIG. 10, the sensor 80 may be mounted in relation to a pivot 35 where the midpoints of a first stud 125 and a second stud 130 attach. In particular, the sensor 80 may be mounted on a mount 120 attached to the first stud 125 and directed toward the pivot 35. The marker 70 may be attached to the second stud 130 through the pivot 35 using a bearing 115, and disposed in cooperation with the sensor 80 as described above. The bearing 115 allows the marker 70 to rotate with the second stud 130 in relation to the first stud 125, which moves the marker 70 through the sensor's 80 range, as described above.

Figure 11:
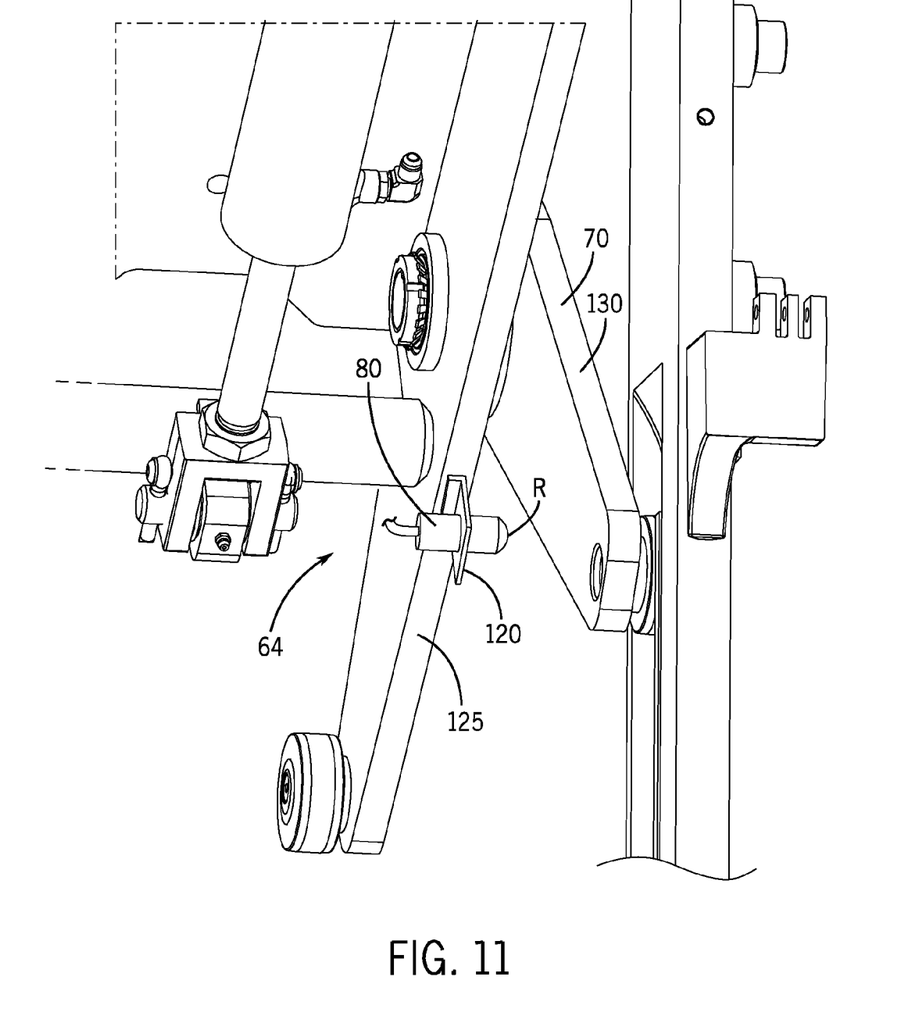
FIG. 11 is a close-up rear left perspective view of a portion of an extension arm with an embodiment of a scissor-mounted sensing apparatus in accordance with this disclosure.

Referring to FIG. 11, the sensor 80 may be mounted in relation to a portion of a first stud 125. In particular, the sensor 80 may be mounted on a mount 120 attached to the first stud 125 and directed toward the second stud 130. In this embodiment, the second stud 130 can serve as the marker 70. As the second stud 130 moves in relation to the first stud 125, the sensor 80 can sense the second stud 130 as it moves through the sensor's 80 range.

Figure 12:
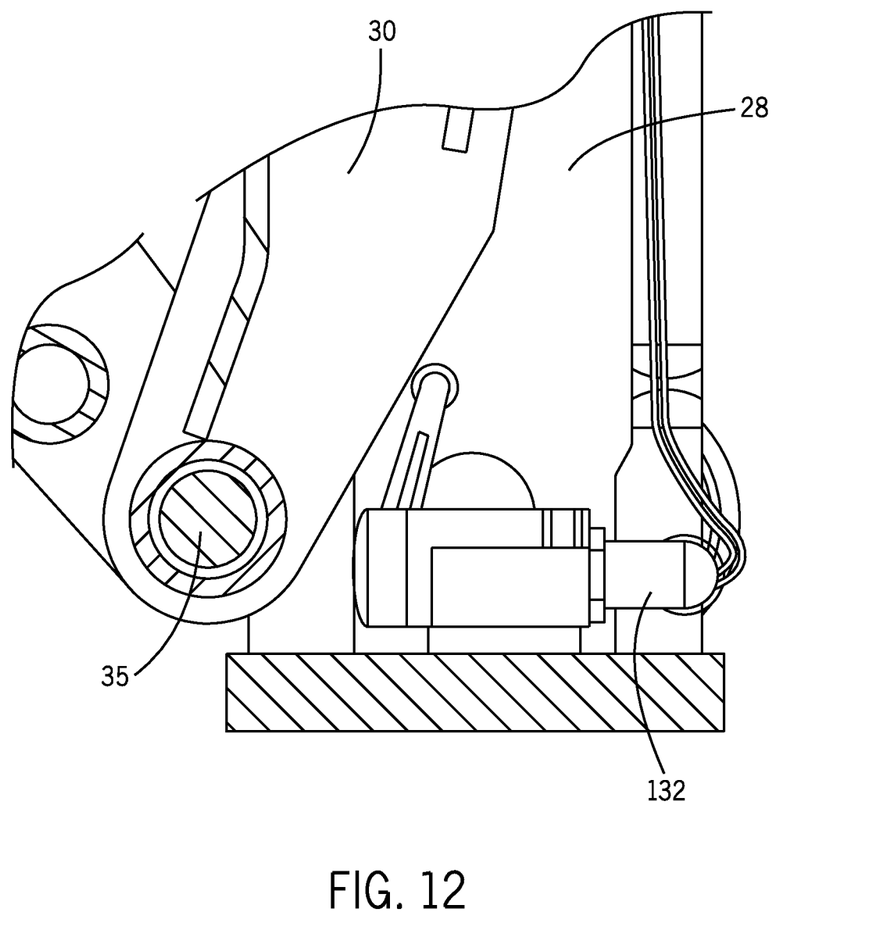
FIG. 12 is a side view of a portion of an extension arm including a limit switch.

Referring to FIG. 12, a switch 132, such as a limit switch, can be coupled to a portion of the carriage frame 28, for example. The switch can be positioned so as to sense when the reach carriage 24 is fully retracted. The switch 132 can provide a signal to the control unit 100. Based upon the status of the signal, e.g., on or off, the control unit 100 can limit or adjust the speed of the reach truck 20 when the reach carriage is not fully retracted.

Preferred embodiments have been described in considerable detail. Many modifications and variations to the preferred embodiment described will be apparent to a person of ordinary skill in the art. Therefore, the invention should not be limited to the embodiments described.

Finally, it is expressly contemplated that any of the processes or steps described herein may be combined, eliminated, or reordered. Accordingly, this description is meant to be taken only by way of example, and not to otherwise limit the scope of this invention.

We claim:

1. A velocity control device for a reach carriage having an extension arm, the velocity control device comprising:
   a sensing apparatus configured to detect when the extension arm is approaching at least one of an extension limit and a retraction limit, and to transmit a position signal, the sensing apparatus comprising:
      a sensor that has a range and generates the position signal; and
      a marker positioned with respect to the extension arm and the sensor so that, during the extension arm extending or retracting, the marker moves into and out of the range of the sensor, the marker moving out of the range of the sensor when the extension arm approaches one or both of the extension limit and the retraction limit, the sensor changing the position signal when the marker moves into and out of the range of the sensor; and
   a control unit configured to:
      receive the position signal;

determine, responsive to the position signal being changed, that the extension arm is approaching the extension limit or the retraction limit; and responsive to a determination that the extension arm is approaching the extension limit or the retraction limit, apply a deceleration profile to gradually or incrementally slow the extension arm to a stop.

2. The velocity control device according to claim 1:
wherein the control unit applies a deceleration profile to slow the extension arm.

3. The velocity control device according to claim 1:
wherein the sensor generates the position signal when the marker is within the range of the sensor and does not generate the position signal when the marker is outside the range of the sensor; and
wherein the control unit gradually slows the extension arm when it does not receive the position signal.

4. The velocity control device according to claim 3:
wherein the control unit allows the extension arm to operate at maximum velocity when the control unit receives the position signal.

5. The velocity control device according to claim 1:
wherein the sensor continuously generates the position signal; and
wherein the control unit gradually slows the extension arm when the position signal indicates that the marker is not within the range of the sensor.

6. The velocity control device according to claim 1:
wherein the marker moves between at least a first position and a second position separated from the first position by an angular range, the marker being in the first position when the extension arm is fully retracted and in the second position when the extension arm is fully extended; and
wherein the range of the sensor is disposed within the angular range of the marker, the first and second positions of the marker being outside the range of the sensor.

7. The velocity control device according to claim 6:
wherein the extension arm is driven by a hydraulic ram cylinder having a tang attached to a stationary clevis such that the tang moves with respect to the clevis;
the marker being a structure attached to and projecting from the tang; and
the sensor being mounted on the clevis.

8. The velocity control device according to claim 7:
wherein the sensor is mounted through a first prong of the clevis; and
wherein the marker moves through a space between the first prong and a second prong of the clevis.

9. The velocity control device according to claim 6:
wherein the sensor is mounted to a first stud of the extension arm; and
wherein the marker is attached to a second stud of the extension arm at a pivot between the first stud and the second stud.

10. In a reach carriage having a carriage frame and a pantographic extension arm attached to the carriage frame and driven by a hydraulic ram cylinder attached to the carriage frame, the extension arm, and a hydraulic pump, a velocity control device for the extension arm, the velocity control device comprising:
a sensing apparatus comprising:
a sensor attached to a clevis on the carriage frame, the sensor having a range, generating a position signal when the sensor is activated, and stopping the position signal when the sensor deactivates; and
a marker that activates the sensor when the marker is in the range of the sensor, the marker being attached to a tang of the hydraulic ram cylinder, the tang cooperating with the clevis, and the marker rotating through an angular range, within which the sensor range is disposed, as the extension arm linearly extends and retracts, the marker rotating out of the range of the sensor when the extension arm approaches both an extension limit and a retraction limit, the sensor deactivating when the marker is outside of the range of the sensor; and
a control unit operatively connected to the sensor and the hydraulic pump and configured to:
receive the position signal; and
responsive to the position signal stopping, instruct the hydraulic pump to gradually reduce a flow rate into the cylinder if the extension arm is extending and to gradually reduce a flow rate out of the cylinder if the extension arm is retracting.

11. The velocity control device according to claim 10:
wherein the marker moves between a first position that is a first cushion distance outside the range of the sensor and a second position that is a second cushion distance outside the range of the sensor, the second position separated from the first position by the angular range;
wherein the marker is in the first position when the extension arm is fully retracted and in the second position when the extension arm is fully extended; and
wherein, when the extension arm is at full velocity, the control unit slows the extension arm as the marker traverses the first or second cushion distance.

12. The velocity control device according to claim 10:
wherein the sensor is mounted through a first prong of the clevis; and
wherein the marker moves through a space between the first prong and a second prong of the clevis.

13. The velocity control device according to claim 10:
wherein the sensor is mounted on a top surface of the clevis between two prongs of the clevis; and
wherein the marker moves through a space between the prongs of the clevis and is positioned so the marker is forward of the sensor when the extension arm is retracted, and rearward of the sensor when the extension arm is extended.

14. The velocity control device according to claim 10:
wherein the sensor is mounted to the clevis forward of the tang; and
wherein the marker is positioned so that it is below the sensor when the extension arm is retracted, and rearward of the sensor when the extension arm is extended.

15. A method of controlling the velocity of an extension arm in a reach carriage, the method comprising:
as the extension arm is being driven by an actuator, receiving a position signal from a sensing apparatus comprising:
a sensor that generates the position signal; and
a marker configured to move into and out of a range of the sensor as the extension arm extends and retracts, the sensor changing the position signal when the marker moves into and out of the range of the sensor;
determining from the position signal whether the extension arm is approaching its extension or retraction limit;
responsive to a determination that the extension arm is approaching its extension or retraction limit, instructing the actuator to gradually reduce an actuation speed; and allowing the extension arm to be driven at full velocity if the extension arm is not approaching its extension or retraction limit.

16. The method according to claim 15:
wherein the sensor is mounted to a first stud of the extension arm; and
wherein the marker is attached to a second stud of the extension arm at a pivot between the first stud and the second stud.

17. The method according to claim 15:
wherein the marker moves between a first position that is a first cushion distance outside the range of the sensor and a second position that is a second cushion distance outside the range of the sensor, the second position separated from the first position by an angular range in which the range of the sensor is disposed;
wherein the marker is in the first position when the extension arm is fully retracted and in the second position when the extension arm is fully extended; and
wherein the actuator is instructed to gradually reduce the actuation speed as the marker traverses the first or second cushion distance.

18. The method according to claim 17:
further comprising configuring a deceleration profile with which the actuation speed is gradually reduced.

19. The method according to claim 15:
wherein the actuator is a hydraulic cylinder, the hydraulic cylinder coupled to a hydraulic pump.

20. The method according to claim 19:
wherein the marker is attached to a tang on the cylinder; and
wherein the sensor is attached to a clevis that cooperates with the tang.

21. The method according to claim 15:
wherein the sensing apparatus is a non-contact sensing apparatus.

22. The method according to claim 15:
wherein the marker is configured to rotate into and out of the range of the sensor as the extension arm linearly extends and retracts.

* * * * *